US008532672B2

(12) United States Patent
Kruglick

(10) Patent No.: US 8,532,672 B2
(45) Date of Patent: Sep. 10, 2013

(54) RADIO LOCALIZATION DATABASE GENERATION BY CAPTURING COGNITIVE RADIO SPECTRUM SENSING DATA

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/390,264

(22) PCT Filed: Aug. 25, 2011

(86) PCT No.: PCT/US2011/049148
§ 371 (c)(1),
(2), (4) Date: Feb. 13, 2012

(87) PCT Pub. No.: WO2013/028198
PCT Pub. Date: Feb. 28, 2013

(65) Prior Publication Data
US 2013/0053059 A1    Feb. 28, 2013

(51) Int. Cl.
*H04W 88/02*    (2009.01)

(52) U.S. Cl.
USPC ........................................ 455/456.1

(58) Field of Classification Search
USPC ............... 455/456.1, 514, 437, 414.1, 414.2; 370/252
See application file for complete search history.

(56) References Cited

U.S. PATENT DOCUMENTS

| | | | |
|---|---|---|---|
| 6,393,294 B1 | 5/2002 | Perez-Breva et al. | |
| 7,525,484 B2 | 4/2009 | Dupray et al. | |
| 7,904,244 B2 | 3/2011 | Sugla | |
| 7,937,094 B2 | 5/2011 | Feher | |
| 2006/0181394 A1* | 8/2006 | Clarke | 340/10.4 |
| 2008/0167049 A1 | 7/2008 | Karr et al. | |
| 2009/0275286 A1 | 11/2009 | Popovich et al. | |
| 2012/0330603 A1* | 12/2012 | Bevan et al. | 702/150 |
| 2013/0023285 A1* | 1/2013 | Markhovsky et al. | 455/456.1 |

OTHER PUBLICATIONS

International Search Report and Written Opinion dated Dec. 19, 2011 in PCT Application No. PCT/US11/49148.
Celebi, H., "Location Awareness in Cognitive Radio Networks," Jun. 24, 2008.
Cisco 2700 Series Wireless Location Appliance, http://www.cisco.com/en/US/products/ps6398/index.html Accessed Mar. 31, 2011.
Howard, A., "Localization Using WiFi Signal Strength," http://robotics.usc.edu/~ahoward/projects_wifi.php Accessed Mar. 31, 2011.
Shin, K.G., "Cognitive Radio Research @ RTCL," Jul. 16, 2009.
Tsui, A.W. et al., "Accuracy Performance Analysis Between War Driving and War Walking in Metropolitan Wi-Fi Localization," Mobile Computing, IEEE Transactions on 9., No. 11, pp. 1551-1562, 2010.
Wikipedia, "Local Positioning System," http://en.wikipedia.org/wiki/Local_positioning_system Accessed Mar. 31, 2011.
YouTube—SCYP Wifi Localization Tool Demo, http://www.youtube.com/watch?v=nTd-mCzIwYM Accessed Mar. 31, 2011.

(Continued)

*Primary Examiner* — Diane Mizrahi
(74) *Attorney, Agent, or Firm* — Hope Baldauff, LLC

(57) ABSTRACT

Technologies are generally described herein for determining a location of a computing device using radio frequency ("RF") information. Some example technologies may receive a local RF fingerprint for radio signals detected by the computing device. The technologies may determine a location of the computing device by identifying a subset of RF information matching the local RF fingerprint. The technologies may provide the location to the computing device.

28 Claims, 6 Drawing Sheets

(56) References Cited

OTHER PUBLICATIONS

Fretzagias, C. et al., "Cooperative location-sensing for wireless networks," Proceedings of the Second IEEE Annual Conference on Pervasive Computing and Communications, pp. 121-131, 2004.

Zhao, Y. et al., "Radio Environment Map Enabled Situation-Aware Cognitive Radio Learning Algorithms," Proceedings of the Software Defined Radio, SDR, Technical Conference, pp. 6, 2006.

* cited by examiner

| RF INFORMATION 200 | | | | | |
|---|---|---|---|---|---|
| LOCATION 202 | LOCATION UNCERTAINTY 204 | DATE AND TIME STAMP 206 | FREQUENCY 208 | POWER LEVEL 210 | CHANNEL IDENTIFIER 212 |
| LATITUDE VALUE, LONGITUDE VALUE | VARIABLE | 10/06/2010 09:24:48 | 2.412 GHz | 0.001 mW | WI-FI BTS-1 |
| 214 | 216 | 218 | 220 | 222 | 224 |

*Fig. 2*

RADIO LOCALIZATION DATABASE GENERATION BY CAPTURING COGNITIVE RADIO SPECTRUM SENSING DATA

BACKGROUND

Unless otherwise indicated herein, the materials described in this section are not prior art to the claims in this application and are not admitted to be prior art by inclusion in this section.

Some computing devices are equipped with technology adapted to estimate the geographic location of the computing devices. One conventional technology equips a computing device with a Global Positioning System ("GPS") receiver. The GPS receiver may be adapted to estimate the location of the computing device based on the distance between the GPS receiver and multiple satellites having known locations. However, GPS receivers may be poorly suited for computing devices having limited power resources because GPS receivers can incur substantial power usage. Further, GPS receivers may fail to operate at street level in urban areas where skyscrapers and other large objects can impede signals between the GPS receiver and the multiple satellites.

SUMMARY

The present disclosure generally describes techniques for determining a location of a computing device using radio frequency ("RF") information. Some example methods may include receiving a local RF fingerprint for radio signals detected by the computing device. Example methods may also include determining a location of the computing device by identifying a subset of RF information matching the local RF fingerprint. Example methods may further include providing the location to the computing device.

The present disclosure generally also describes some systems for determining a location of a computing device using RF information. Some example systems may include a location positioning system. The location positioning system may be adapted to receive a local RF fingerprint for radio signals detected by the computing device. The location positioning system may also be adapted to determine a location of the computing device by identifying a subset of RF information that matches the local RF fingerprint. The location positioning system may further be adapted to provide the location to the computing device.

The present disclosure generally further describes some computer-readable media for determining a location of a computing device using RF information. The computer-readable media may have computer-executable instructions stored thereon which, when executed by a computer, cause the computer to perform one or more operations. Some example computer-executable instructions may cause the computer to receive a load instruction adapted to cause the computer to receive a request for a location of the cognitive radio device. The request may include a local RF fingerprint for radio signals detected by the cognitive radio device. Example computer-executable instructions may also cause the computer to determine the location of the cognitive radio device by identifying a subset of RF information that matches the local RF fingerprint. Example computer-executable instructions may further cause the computer to provide the location to the cognitive radio device over the communications network.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 2 is a table illustrating example RF information obtained by a cognitive radio device;

Figure 1:
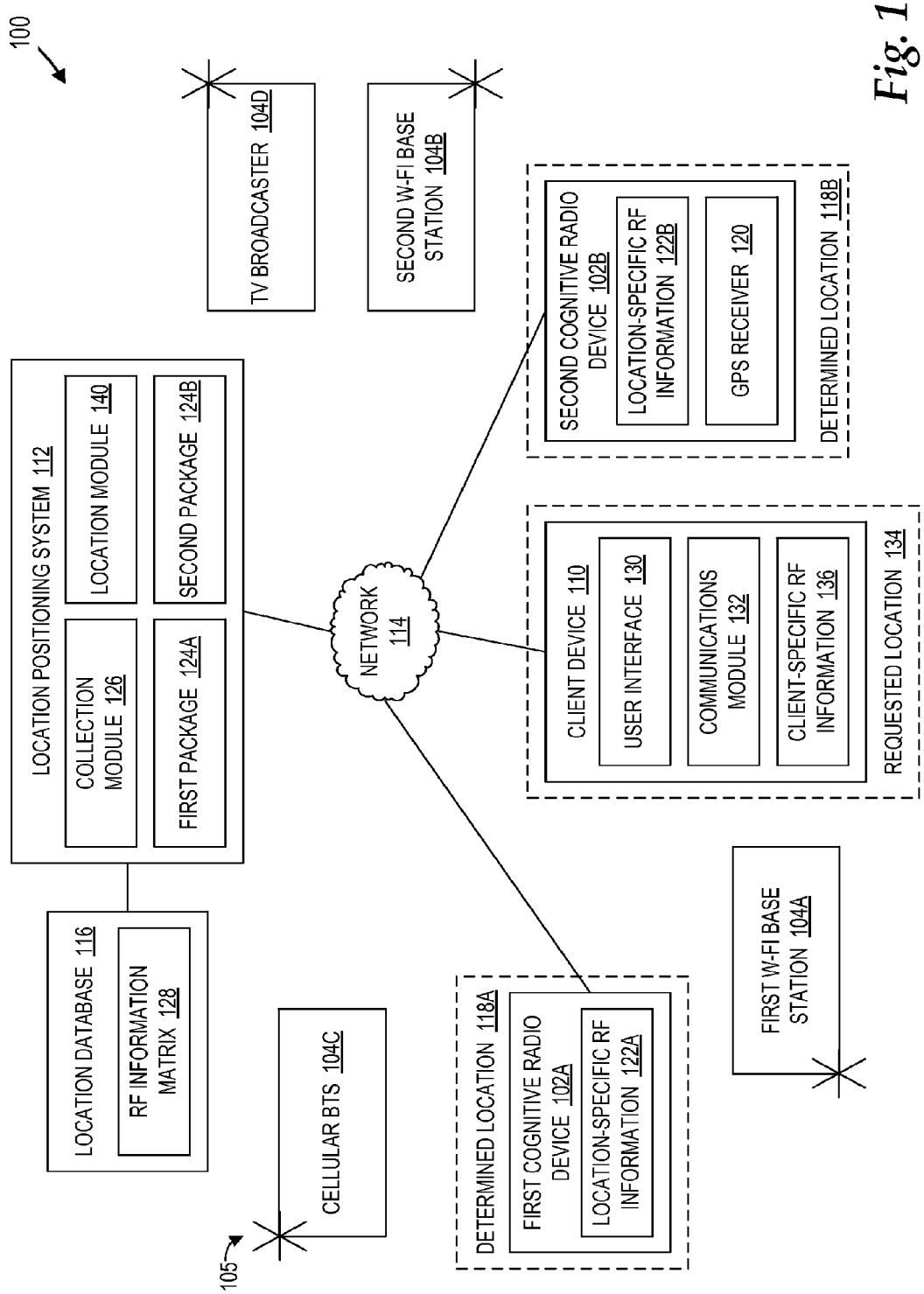
FIG. 1 is a functional block diagram illustrating an example location determination architecture adapted to determine a location of a computing device based on RF information.

all arranged according to at least some embodiments presented herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to location positioning technology adapted to determine a location of a computing device based on radio frequency ("RF") information. Multiple cognitive radio devices may have knowledge of their location. Each cognitive radio device may be configured to detect radio signals within a broadcast radius of the cognitive radio device and obtain location-specific RF information associated with the detected radio signals. The location-specific RF information may include, for example, a frequency of each detected radio signal, a power level of each detected radio signal, and a channel identifier associated with a corresponding RF emitter that produces each detected radio signal.

Each cognitive radio device may be configured to periodically transmit their location and the location-specific RF information to a location positioning system. The location positioning system may be a centralized server computer adapted to obtain RF information from remote cognitive radio devices. As the location positioning system receives the location and the location-specific RF information from the cognitive radio devices, the location positioning system may be configured to update a location database. The location database may be configured to maintain a RF information matrix that represents RF information obtained from cognitive radio devices positioned in known geographic locations. That is, the RF information matrix may contain multiple geographic locations, where each geographic location has a corresponding location-specific set of RF information.

Users may be given access to a non-GPS location determination service that utilizes the location positioning system and the location database. In an example implementation of the location determination service, a client device may be configured to detect radio signals within a broadcast radius of the client device and obtain client-specific RF information associated with the detected radio signals. The client-specific RF information may essentially form a "RF fingerprint" that is likely unique given a current position of the client device. That is, as a user moves the client device from its current position, the client-specific RF information, and hence the RF fingerprint, may change. The client device may be configured to transmit the client-specific RF information to the location positioning system along with a request for a current geographic location of the client device.

The location positioning system may be configured to receive the client-specific RF information and the request from the client device. The location positioning system may be configured to determine the current geographic location by matching the client-specific RF information with the existing data points in the RF information matrix. These existing data points may be associated with known geographic locations. Using these existing data points in the RF information matrix and assuming transitions between these data points, the location positioning system may be configured to estimate a location where the client device positioned at this location would obtain the client-specific RF information. This estimated location may be the current geographic location. The location positioning system may be configured to perform the estimation utilizing triangulation, plotting, error minimization, best fit matching, and/or other suitable data analysis techniques. When the location positioning system determines the current geographic location, the location positioning system may be configured to provide the current geographic location to the client device in response to the client device's request.

The client device may utilize significantly less power to obtain the client-specific RF information compared to operating a GPS receiver. As such, the location determination service may be suitable for computing devices having power constraints. Further, the location positioning system may be capable of determining the current location of the client device with at least the same accuracy as a GPS receiver. In many cases, the location positioning system may be more accurate than Assisted GPS, WI-FI positioning, and/or cellular network positioning technologies.

FIG. 1 is a functional block diagram illustrating an example location determination architecture 100 adapted to determine a location of a computing device based on RF information, arranged in accordance with at least some embodiments presented herein. The location determination architecture 100 may include a first cognitive radio device 102A, a second cognitive radio device 102B, a first WI-FI base station 104A, a second WI-FI base station 104B, a cellular base transceiver station ("BTS") 104C, a television broadcaster 104D, a client device 110, and a location positioning system 112. The first cognitive radio device 102A and the second cognitive radio device 102B may be collectively referred to as cognitive radio devices 102. The first WI-FI base station 104A, the second WI-FI base station 104B, the cellular BTS 104C, and the television broadcaster 104D may be collectively referred to as RF emitters 104 (denoted by a star, such as a star 105). The cognitive radio devices 102, the client device 110, and the location positioning system 112 may be coupled via a network 114. The location positioning system 112 may be coupled to a location database 116.

The RF emitters 104 may generally refer to suitable devices capable of emitting a radio signal. Some examples of the RF emitters 104 may include the first WI-FI base station 104A, the second WI-FI base station 104B, the cellular BTS 104C, and the television broadcaster 104D. The first WI-FI base station 104A and the second WI-FI base station 104B may be adapted to emit radio signals via WI-FI transmissions. The cellular BTS 104C may be adapted to emit radio signals via cellular transmissions. The television broadcaster 104D may be adapted to emit radio signals via television transmissions. In some embodiments, the cognitive radio devices 102 may also be RF emitters capable of broadcasting radio signals at various frequencies.

In addition to emitting a radio signal, the RF emitters may also be adapted to broadcast a channel identifier. The channel identifier may provide identifying information regarding the particular RF emitter. In a first example, the first WI-FI base station 104A and the second WI-FI base station 104B may each be adapted to broadcast a unique service set identifier ("SSID"). In a second example, the cellular BTS 104C may be adapted to broadcast a carrier and a unique code. In a third example, the television broadcaster 108 may be adapted to broadcast a television station identifier. The channel identifier may be represented as text, numbers, symbols, or combinations thereof.

The first cognitive radio device 102A may be positioned at a first determined geographic location 118A. The second cognitive radio device 102B may be positioned at a second determined geographic location 118B. The first determined geographic location 118A and the second determined geographic location 118B may be collectively referred to as determined geographic locations 118. Each of the determined geographic locations 118 may be represented by a physical address, coordinates (e.g., latitudinal and longitudinal), or other suitable data capable of conveying the determined geographic locations 118. Each of the determined geographic locations 118 may also be associated with a location uncertainty value. The location uncertainty value may refer to an approximation factor based on how and/or when a cognitive radio device obtains its geographic location. A lower location uncertainty value may indicate that the determined geographic location has a higher reliability, whereas a higher location uncertainty value may indicate that the determined geographic location has a lower reliability.

In some embodiments, a cognitive radio device may have knowledge of its geographic location because the cognitive radio device has a fixed geographic location and the fixed geographic location has been previously determined. For example, the first cognitive radio device 102A may be connected to a WI-FI router located at a coffee shop. The WI-FI router may be associated with an Internet Protocol ("IP") address. The first cognitive radio device 102A may be configured to determine that the IP address is associated with a physical address of the coffee shop. The physical address of the coffee shop may represent the first determined geographic location 118A. The first cognitive radio device 102A may also be configured to associate a first location uncertainty value with the first determined geographic location 118A. The first location uncertainty value may be relatively small because the physical address is a fixed location.

In some other embodiments, a cognitive radio device may have knowledge of its geographic location because the cognitive radio device includes a GPS receiver. For example, the second cognitive radio device 102B may include a GPS receiver 120 that is adapted to determine the GPS coordinates associated with a position of the second cognitive radio device 102B. The GPS coordinates may represent the second determined geographic location 118B. The second cognitive radio device 102B may also be configured to associate a second location uncertainty with the second determined geographic location 118B. The second location uncertainty value may be relatively small to reflect the increased accuracy of location determination utilizing the GPS receiver 120 as compared to utilizing the IP address associated with the WI-FI router.

In various other embodiments, the location uncertainty value may also be affected by whether the corresponding cognitive radio device is stationary or moving. For example, the location uncertainty value may be a lower value when the corresponding cognitive radio device is stationary and a higher value when the corresponding cognitive radio device is moving. The movement may introduce error because of the amount of time taken to complete a sweep of the frequencies. If, for example, the cognitive radio device takes five seconds to complete the sweep, then the location uncertainty value may be a path length computed by multiplying five seconds and a velocity in meters per second. The data collected by the cognitive radio device during the sweep may correspond to this path. Some other example factors that may affect the location uncertainty value include weather, air temperature, or time of day. In particular, attenuation rates and/or transmission strengths may be affected by the presence of rain, may differ between daytime and nighttime, and/or may be affected by different air temperatures. In various other embodiments, the cognitive radio devices 102 may also utilize Assisted GPS, WI-FI positioning, cellular network positioning, war-driving, war-walking, and other suitable technologies adapted to determine the geographic locations of the cognitive radio devices 102.

Cognitive radio devices, such as the cognitive radio devices 102, may generally operate by detecting underutilized radio frequencies in the radio frequency spectrum. Many cognitive radio devices may be configured to provide improved utilization of the radio frequency spectrum by accessing these underutilized radio frequencies. During the process of detecting the underutilized radio frequencies, each of the cognitive radio devices 102 may be configured to detect multiple radio signals within a broadcast radius of the cognitive radio device. Each of the cognitive radio devices 102 may also be configured to obtain various RF information associated with each of the radio signals. Some examples of the RF information may include the frequency of each radio signal, a power level of each radio signal, and a channel identifier associated with the corresponding RF emitter producing the radio signal.

Generally, a cognitive radio device, such as each of the cognitive radio devices 102, may be configured to scan radio frequencies over a continuous (i.e., non-discrete) spectrum. Further, the cognitive radio device may be configured to detect radio frequencies that are not associated with (e.g., licensed by, owned by, etc.) service providers of cognitive radio devices. For example, a regulatory body, such as the Federal Communication Commission ("FCC"), may license or allocate certain radio frequencies to various service providers. A cognitive radio device associated with a given service provider may be configured to detect and utilize licensed frequencies associated with the given service provider, licensed frequencies associated with other service providers, and/or unlicensed frequencies.

Each of the RF emitters 104 may be configured to output a radio signal. Each of the cognitive radio devices 102 may be configured to detect one or more of the radio signals depending on the frequency of the radio signal and/or a distance between the cognitive radio device and each of the RF emitters 104. For example, the first cognitive radio device 102A may be configured with different tuners and/or filters than the second cognitive radio device 102B. As a result, the first cognitive radio device 102A may be configured to detect different frequencies than the second cognitive radio device 102B. Further, the RF emitters 104 may each be configured to output the radio signal within a certain broadcast radius. Some RF emitters may be able to broadcast a farther distance than some other RF emitters. Thus, the cognitive radio devices 102 may detect different radio signals depending on the respective distances between the position of the cognitive radio devices 102 and the RF emitters 104.

When the first cognitive radio device 102A detects the radio signals emitted by one or more of the RF emitters 104, the first cognitive radio device 102A may be configured to obtain first location-specific RF information 122A based on the detected radio signals. When the second cognitive radio device 102B detects the radio signals emitted by one or more of the RF emitters 104, the second cognitive radio device 102B may be configured to obtain second location-specific RF information 122B based on the detected radio signals. The first location-specific RF information 122A and the second location-specific RF information 122B may be collectively referred to as location-specific RF information 122. The RF information for each detected radio signal may be associated with a date and time stamp that indicates when the RF information for the detected radio signal was obtained.

The first location-specific RF information 122A may differ from the second location-specific RF information 122B. In particular, the detected radio signals may differ depending of the frequency of the radio signal and/or a distance between each of the cognitive radio devices 102 and each of the RF emitters 104, as previously described. Further, the power levels of the detected signals may differ depending on the respective distances between each of the cognitive radio devices 102 and each of the RF emitters 104. For example, as illustrated in FIG. 1, the distance between the first cognitive radio device 102A and the cellular BTS 104C may be less than the distance between the second cognitive radio device 102B and the cellular BTS 104C. Thus, even when both the first cognitive radio device 102A and the second cognitive radio device 102B can detect the radio signal emitted by the cellular BTS 104C, the power level of the radio signal detected by the first cognitive radio device 102A may be higher than the power level of the radio signal detected by the second cognitive radio device 102B. The power levels may be judged in an absolute sense (e.g., a specific power level) or in a relative sense (e.g., a power level of one device relative to a power level of another device), depending on particular implementations. Judging the power levels in the relative sense may normalize out antenna and situation reception differences.

When the first cognitive radio device 102A obtains the first location-specific RF information 122A, the first cognitive radio device 102A may be configured to transmit the first location-specific RF information 122A to the location positioning system 112. The first cognitive radio device 102A may also be configured to transmit the first determined geographic location 118A, the location uncertainty associated with the first determined geographic location 118A, and the date and time stamp when the first location-specific RF information 122A was obtained to the location positioning system 112. When the second cognitive radio device 102B obtains the second location-specific RF information 122B, the second cognitive radio device 102B may be configured to transmit the second location-specific RF information 122B to the location positioning system 112. The second cognitive radio device 120B may also be configured to transmit the second determined geographic location 118B, the location uncertainty associated with the second determined geographic location 118B, and the date and time stamp when the second location-specific RF information 122B was obtained to the location positioning system 112.

The cognitive radio devices 102 may be configured to detect the radio signals, obtain the location-specific RF information 122, and/or transmit the location-specific RF information 122 to the location positioning system 112 according to a predefined schedule or at regular intervals. In some implementations, the determined geographic locations 118 and the location uncertainties associated with the determined geographic locations 118 may be transmitted to the location positioning system 112 less frequently than the location-specific RF information 122 is transmitted to the location positioning system 112.

In one example, if the first cognitive radio device 102A is a stationary device, then the first determined geographic location 118A may be a permanent or semi-permanent location such that the first cognitive radio device 102A may be configured to transmit once or transmit less frequently the first determined geographic location 118A to the location positioning system 112. If the second cognitive radio device 102B is a moving device, then the second determined geographic location 118B may be temporary such that the second cognitive radio device 102B may be configured to transmit more frequently the second determined geographic location 118B to the location positioning system 112. The cognitive radio devices 102 may be configured with accelerometers, gyroscopes, and/or other suitable inertia sensing technologies adapted to determine whether the cognitive radio devices 102 are stationary or moving.

In another example, if the first cognitive radio device 102A has access to a battery or other limited power source, then the first cognitive radio device 102A may be configured to transmit once or transmit less frequently the first determined geographic location 118A to the location positioning system 112. If the second cognitive radio device 102B has access to a consistent power source, then the second cognitive radio device 102B may be configured to transmit more frequently the second determined geographic location 118B to the location positioning system 112.

In some embodiments, the cognitive radio devices 102 may be configured to provide their users with an option that causes the cognitive radio devices 102 to obtain the location-specific RF information 122 and upload the location-specific RF information 122 to the location positioning system 112. A user may enable the option to allow the cognitive device to authorize the sharing of location-specific RF information with the location positioning system 112. The user may disable the option to prevent the sharing of location-specific RF information with the location positioning system 112. A provider of the location positioning system 112 may provide an incentive to those users who choose to enable the option. One example incentive may include a monetary payment. Other example incentives may include free and/or discounted access to goods and/or services. For example, the provider may provide free access to a non-GPS location determination service provided by the location positioning system 112.

The first cognitive radio device 102A may be configured to encode the first location-specific RF information 122A, the first determined geographic location 118A, the location uncertainty associated with the first determined geographic location 118A, and/or the corresponding date and time stamp into a first package 124A. The second cognitive radio device 102B may be configured to encode the second location-specific RF information 122B, the second determined geographic location 118B, the location uncertainty associated with the second determined geographic location 118B, and/or the corresponding date and time stamp into a second package 124B. The first package 124A and the second package 124B may be collectively referred to as packages 124. The data contained in the packages 124 may be represented as a table, Extensible Markup Language ("XML") data structure, flat database file, compact binary code, or other suitable data structure or data format. The packages 124 may also be compressed, according to some embodiments. The first cognitive radio device 102A may be configured to transmit the first package 124A to a collection module 126 in the location positioning system 112. The second cognitive radio device 102B may be configured to transmit the second package 124B to the collection module 126.

When the collection module 126 receives the first package 124A, the collection module 126 may be configured to uncompress, as necessary, the first package 124A to access the first location-specific RF information 122A, the first determined geographic location 118A, the location uncertainty associated with the first determined geographic location 118B, and/or the corresponding date and time stamp. When the collection module 126 receives the second package 124B, the collection module 126 may be configured to uncompress, as necessary, the second package 124B to access the second location-specific RF information 122B, the second determined geographic location 118B, the location uncertainty associated with the second determined geographic location 118B, and/or the corresponding date and time stamp. The collection module 126 may be configured to update a RF information matrix 128 stored in the location database 116 with the data contained in the packages 124.

The location database 116 may be configured as a flat database, a structured database, a relationship database, or other suitable database configuration adapted to store the data from the packages 124 and provide access to the data. The RF information matrix 128 may be configured to store a location and a location uncertainty for each cognitive radio device providing the location-specific RF information for the location database 116. The RF information matrix 128 may also be configured to store the location-specific RF information and the date and time stamps associated with the location-specific RF information. The location database 116 may be configured to keep data for a limited amount of time. For example, the location database 116 may be configured to remove location-specific RF information having a date and time stamp that is older than a threshold.

The client device 110 may include a user interface 130 and a communications module 132. The client device 110 may be positioned at a requested geographic location 134. The user interface 130 may be configured to enable a user of the client device 110 to request a determination of the requested geographic location 134 via a non-GPS location determination service. The location positioning system 112 may be configured to provide the non-GPS location determination service. For example, the user may pay a subscription fee in order to have access to the non-GPS location determination service.

The client device 110 may be a cognitive radio device. When the user requests a determination of the requested geographic location 134 through the user interface 130, the client device 110 may be configured to detect the radio signals emitted by one or more of the RF emitters 104 and obtain client-specific RF information 136 based on the detected radio signals. As previously described, some examples of the RF information may include the frequency of each radio signal, a power level of each radio signal, and a channel identifier associated with the corresponding RF emitter producing the radio signal. The communications module 132 may be configured to transmit the client-specific RF information 136 along with a request for a determination of the requested geographic location 134 to a location module 140 in the location positioning system 112.

When the location module 140 receives the client-specific RF information 136 and the request for a determination of the requested geographic location 134, the location module 140 may be configured to determine the requested geographic location 134 based on the client-specific RF information 136 and the data contained in the RF information matrix 128. In some embodiments, the location module 140 may be configured to perform a reverse nearest neighbor query on at least a portion of the client-specific RF information 136 with respect to the RF information matrix 128. For example, the location module 140 may be configured to perform a reverse nearest neighbor query on the channel identifiers in the client-specific RF information 136 with respect to the RF information matrix 128. Generally, a reverse nearest neighbor query for a given query point will find data objects for which the query point is the nearest neighbor. Thus, the reverse nearest neighbor query on the channel identifiers the client-specific RF information 136 may result in a subset of RF information contained in the RF information matrix 128 that is associated with RF emitters near the client device 110. This subset of RF information may essentially define a vicinity from which the requested geographic location 134 can be determined.

When the location module 140 identifies the subset of RF information, the location module 140 may be configured to determine the requested geographic location 134 by matching the client-specific RF information 136 with the subset of RF information. The subset of RF information may include existing data points that are associated with known geographic locations. Using these existing data points and assuming transitions between the data points, the location module 140 may be configured to estimate a location where the client device 110 positioned at this location would obtain the client-specific RF information 136. This estimated location may correspond to the requested geographic location 134. The location module 140 may be configured to perform the estimation utilizing triangulation, plotting, error minimization, best fit matching, or other suitable data analysis techniques.

For example, the subset of RF information may contain a distribution of power levels corresponding to multiple radio signals. Here, the location module 140 may be configured to match the client-specific power levels with the distribution of power levels to estimate the likely geographic location of the client device 110. That is, given multiple known geographic locations where the cognitive radio devices 102 obtained certain power levels, the location module 140 may be configured to estimate the geographic location where the client device 110 would obtain the client-specific power levels.

When the location module 140 determines the requested geographic location 134, the location module 140 may be configured to transmit the requested geographic location 134 to the communications module 132 in response to the user's request. The location module 140 may also be configured to update the RF information matrix with the requested geographic location 134 and the client-specific RF information 136. The communications module 132 may be configured to output the requested geographic location 134 to the user via the user interface 130. The requested geographic location 134 may be represented by a physical address, coordinates (e.g., latitudinal and longitudinal), or other suitable data capable of conveying the requested geographic location 134. In some other embodiments, the communications module 132 may be configured to supplement other location determination technologies with the result from the location positioning system 112.

In some embodiments, another party other than the user of the client device 110 may initiate the request for a determination of the requested geographic location 134. For example, a remote advertiser server may be configured to receive the client-specific RF information 136 from the client device 110. The remote advertiser server may then be configured to transmit the client-specific RF information 136 and a request for a determination the requested geographic location 134 to the location positioning system 112 to the location module 140. The location module 140 may be configured to determine the requested geographic location 134 and provide the requested geographic location 134 to the remote advertiser server. The remote advertiser server may be configured to customize advertisements provided to the user based on the requested geographic location 134.

FIG. 2 is a table illustrating example RF information 200 obtained by a cognitive radio device, arranged in accordance with at least some embodiments presented herein. The cognitive radio device may be configured to obtain at least a portion of the RF information 200 based on detected radio signals emitted from RF emitters within a broadcast radius of the cognitive device. Some examples of the cognitive radio device may include the cognitive radio devices 102 and the client device 110.

The RF information 200 may contain multiple types of information, including a location 202, a location uncertainty 204, a date and time stamp 206, a frequency 208, a power level 210, and a channel identifier 212. A first value 214 may represent an example of the location 202. A second value 216 may represent an example of the location uncertainty 204. A third value 218 may represent an example of the date and time stamp 206. A fourth value 220 may represent an example of the frequency 208. A fifth value 222 may represent an example of the power level 210. A sixth value 224 may represent an example of the channel identifier 212.

The location 202 may refer to a location of the cognitive radio device. The first value 214 includes a latitude coordinate value and a longitude coordinate value. In some other embodiments, the location 202 may be represented by a physical address or another coordinate system. The location uncertainty 204 may refer to an approximation factor based on how and/or when the cognitive radio device obtains the location 202. The second value 216 indicates that the location uncertainty 204 may be variable depending on implementation. For example, the location uncertainty 204 may be a real number between zero and one, where a higher value indicates a higher uncertainty and a lower value indicates a lower uncertainty. In some other implementations, the location uncertainty 204 may be a percentage, ratio, or other suitable representation.

The date and time stamp 206 may refer to a date and time when the frequency 208, the power level 210, and the channel identifier 212 are obtained by the cognitive device. The third value 218 includes a date of Oct. 6, 2010 and a time of around 9:24 am. The date and time stamp 206 may be utilized to determine when the RF information 200 is outdated. For example, the location database 116 may be configured to compare the date and time stamp 206 with a threshold. When the date and time stamp 206 exceeds the threshold, then the location database 116 may be configured to purge the RF information 200.

The frequency 208 may refer to a frequency of a radio signal emitted by a particular RF emitter. The RF information 200 may contain a separate frequency corresponding to each detected radio signal when the cognitive radio device detects multiple radio signals. The fourth value 220 includes a frequency of 2.412 gigahertz.

The power level 210 may refer to a power level of a radio signal emitted by a particular RF emitter. The RF information 200 may contain a separate power level corresponding to each detected radio signal when the cognitive radio device detects multiple radio signals. The fifth value 222 includes a power level of 0.001 milliwatts ("mW"). The power level 210 may also be expressed in terms of power ratio in decibels of the measured power referenced to one milliwatt ("dBm"). The power level 210 expressed in dBm may be in terms of signal to noise which is the power magnitude above the general background and is less equipment specific.

The channel identifier 212 may refer to a channel identifier broadcasted by a particular RF emitter. The RF information 200 may contain a separate channel identifier corresponding to each detected radio signal when the cognitive radio device detects multiple radio signals. The sixth value 224 includes an identifier "WI-FI BTS-1." The channel identifier 212 may be represented by text, numbers, symbols, or combinations thereof. The channel identifier 212 may also be determined by referencing the detected frequency to a table of stable uses. For example, television channels may be associated with a frequency that does not change. The channel identifier 212 may further be identified by modulation format. That is, it may be faster to identify the modulation format and/or known usage than to actually obtain a broadcasted identifier.

Figure 3:
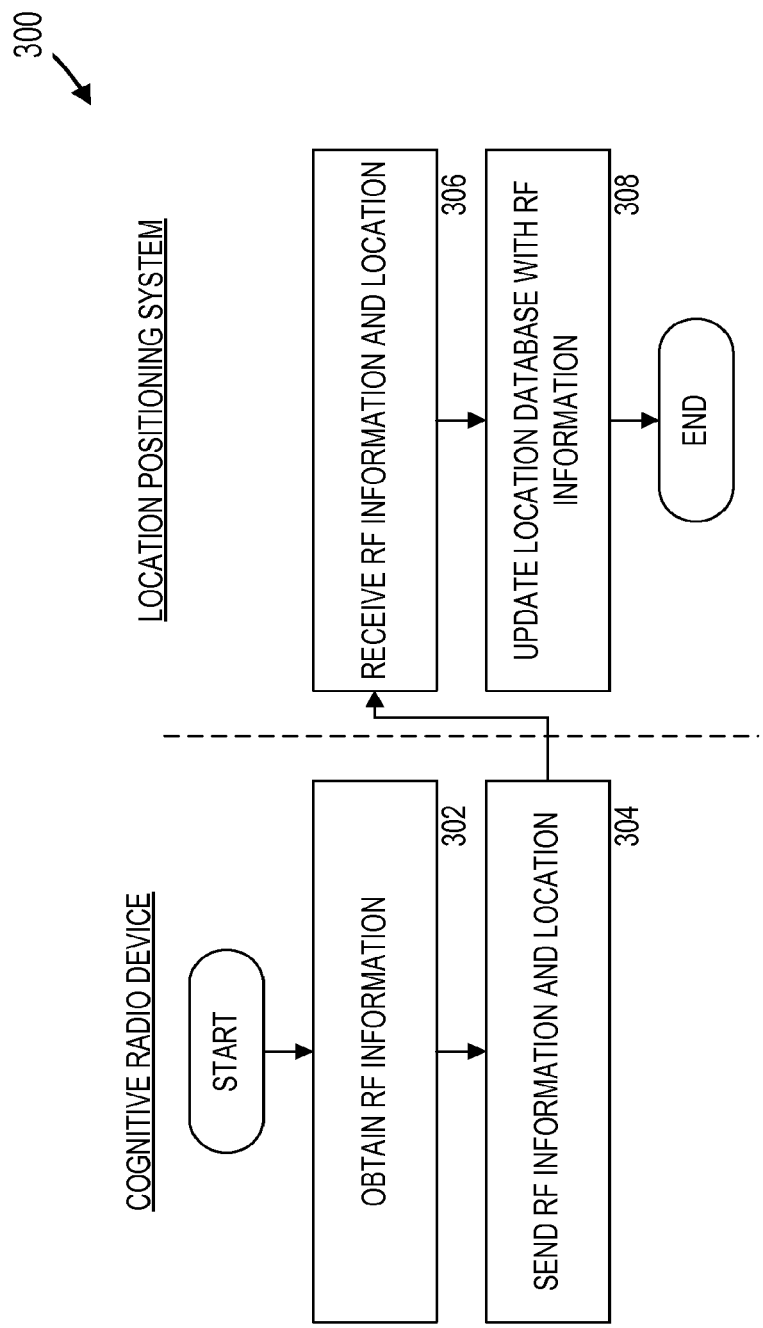
FIG. 3 is a flow diagram illustrating an example process adapted to obtain and store RF information in a location database.

FIG. 3 is a flow diagram illustrating an example process 300 adapted to obtain and store RF information in a location database, arranged in accordance with at least some embodiments presented herein. The process 300 may include various operation, functions, or actions as illustrated by one or more blocks 302 through 308.

The process 300 may begin at block 302 (Obtain RF Information), where a cognitive radio device may be configured to obtain RF information. The cognitive radio device may be configured to detect radio signals emitted from RF emitters within a broadcast radius of the cognitive radio device. The cognitive radio device may be configured obtain the RF information based on the detected radio signals. Some examples of RF information may include a frequency of each detected radio signal, a power level of each detected radio signal, and a channel identifier associated with a corresponding RF emitter that produces each detected radio signal. Block 302 may be followed by block 304.

At block 304 (Send RF Information and Location), the cognitive radio device may be configured to send the RF information to a determined location positioning system. The cognitive radio device may also be configured to send a location of the cognitive radio device to the location positioning system. The cognitive radio device may be configured to send the RF information and/or the location according to a predefined schedule or at regular intervals. Block 304 may be followed by block 306.

At block 306 (Receive RF Information and Location), the location positioning system may be configured to receive the RF information and the location from the cognitive radio. The location positioning system may be configured to receive RF information and locations from multiple cognitive radios. Block 306 may be followed by block 308.

At block 308 (Update Location Database with RF Information), the location positioning system may be configured to update a location database with the RF information and the location. After block 308, the process 300 may either repeat (e.g., periodically, continuously, or on demand as needed) or terminate.

Figure 4:
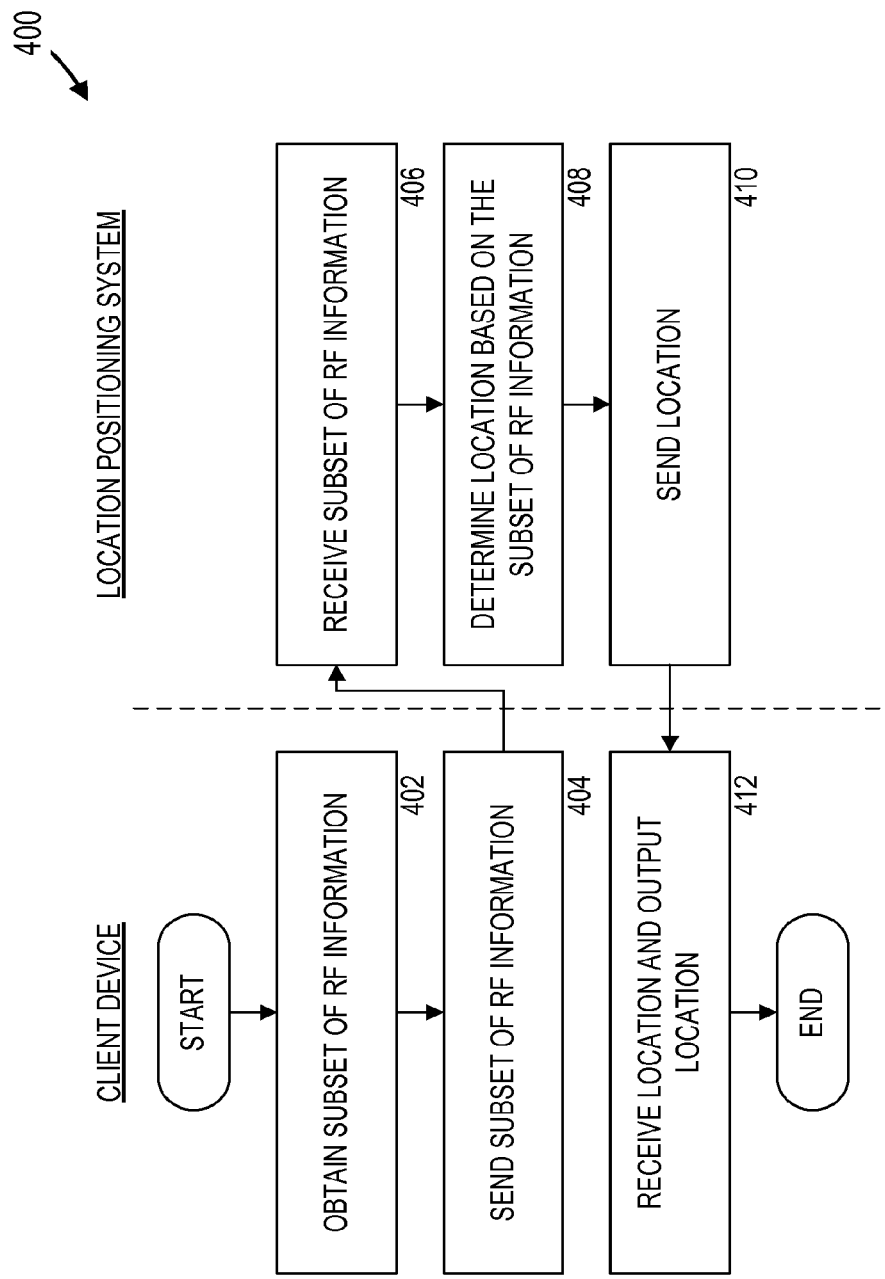
FIG. 4 is a flow diagram illustrating an example process adapted to determine a location of a client device based on RF information.

FIG. 4 is a flow diagram illustrating an example process 400 adapted to determine a location of a client device based on RF information, arranged in accordance with at least some embodiments presented herein. The process 400 may include various operation, functions, or actions as illustrated by one or more blocks 402 through 412.

The process 400 may begin at block 402 (Obtain Subset of RF Information), where a client device may be configured to obtain a subset of RF information. The client device may be configured to detect radio signals emitted from RF emitters within a broadcast radius of the client device. The client device may be configured obtain the RF information based on the detected radio signals. Some examples of RF information may include a frequency of each detected radio signal, a power level of each detected radio signal, and a channel identifier associated with a corresponding RF emitter that produces each detected radio signal. Block 402 may be followed by block 404.

At block 404 (Send Subset of RF Information), the client device may be configured to send the subset of RF information to a location positioning system. The client device may also be configured to accompany the subset of RF information with a request for a determination of a location of the client device using a non-GPS location determination service. Block 404 may be followed by block 406.

At block 406 (Receive Subset of RF Information), the location positioning system may be configured to receive the subset of RF information from the client device. The location positioning system may also be configured to receive the request for a determination of the location of the client device from the client device. Block 406 may be followed by block 408.

At block 408 (Determine Location Based on the Subset of RF Information), the location positioning system may be configured to determine the location of the client device by matching the subset of RF information with the RF information stored in a location database. Using the data contained in the location database, the location positioning system may be configured to estimate a location where the client device positioned at this location would obtain the subset of RF information. The location positioning system may be configured to perform the estimation utilizing triangulation, plotting, error minimization, best fit matching, and/or other suitable data analysis techniques. Block 408 may be followed by block 410.

At block 410 (Send Location), the location positioning server may be configured to send the location to the client device. The location positioning server may be configured to send the location to the client device in response to the client device's request for a determination of the location of the client device using a non-GPS location determination service. Block 410 may be followed by block 412.

At block 412 (Receive Location and Output Location), the client device may be configured to receive the location from the location positioning server. The client device may then be configured to output the location via the client device. For example, the client device may include a user interface adapted to display the result of the non-GPS location determination service. After block 412, the process 400 may either repeat (e.g., periodically, continuously, or on demand as needed) or terminate.

Figure 5:
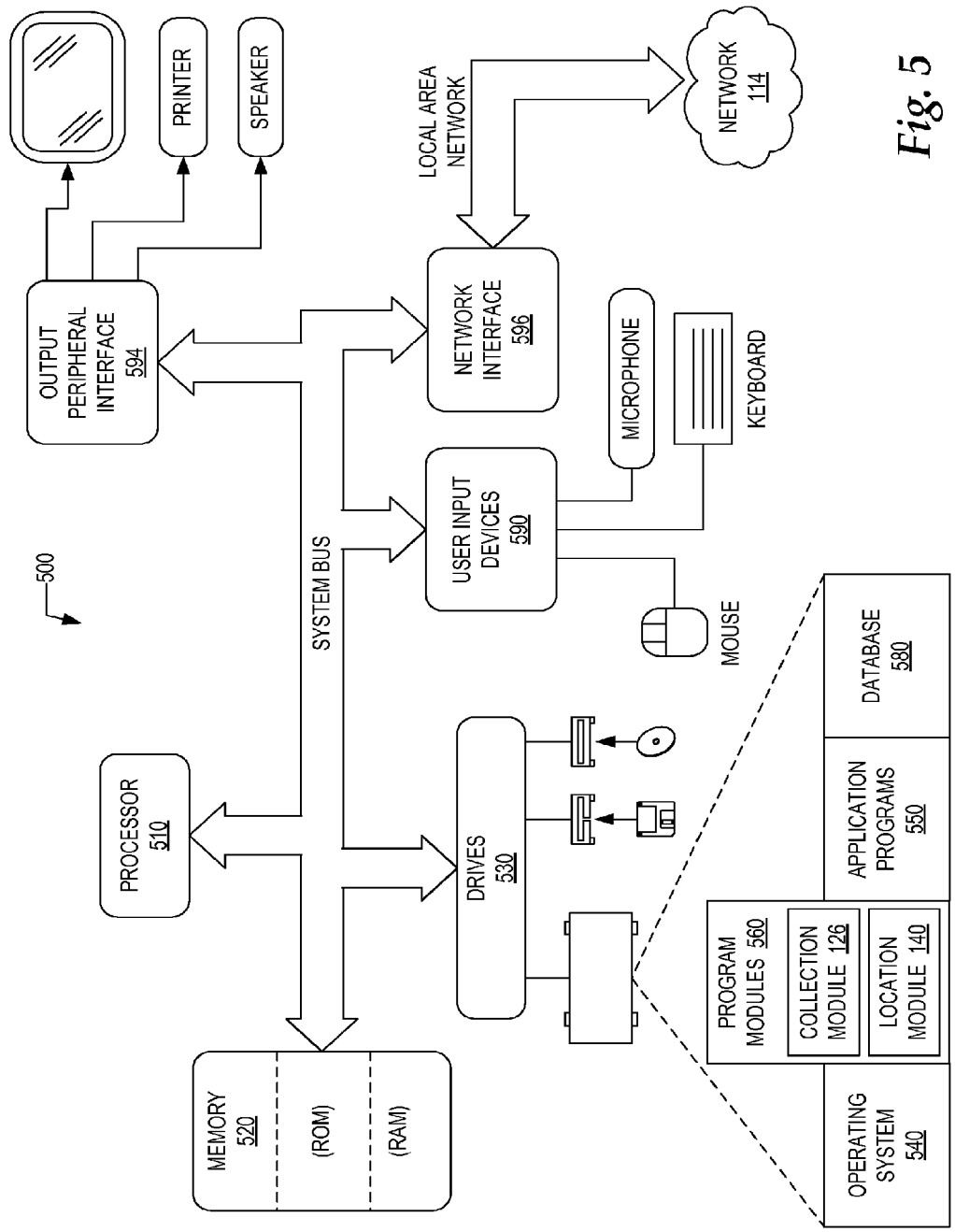
FIG. 5 is a block diagram illustrating a computer hardware architecture for an example computing system.

FIG. 5 is a block diagram illustrating a computer hardware architecture for an example computing system, arranged in accordance with at least some embodiments presented herein. FIG. 5 includes a computer 500, including a processor 510, memory 520, and one or more drives 530. The computer 500 may be implemented as a conventional computer system, an embedded control computer, a laptop, or a server computer, a mobile device, a set-top box, a kiosk, a vehicular information system, a mobile telephone, a customized machine, or other hardware platform.

The drives 530 and their associated computer storage media, provide storage of computer readable instructions, data structures, program modules and other data for the computer 500. The drives 530 can include an operating system 540, application programs 550, program modules 560, and a database 580. Some examples of the program modules 560 may include the user interface 130 and the communications module 132. Some other examples of the program modules 560 may include the collection module 126 and the location module 140. The computer 500 further includes user input devices 590 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be coupled to the processor 510 through a user input interface that is coupled to a system bus, but may be coupled by other interface and bus structures, such as a parallel port, game port or a universal serial bus ("USB"). Computers such as the computer 500 may also include other peripheral output devices such as speakers, which may be coupled through an output peripheral interface 594 or the like.

The computer 500 may operate in a networked environment using logical connections to one or more computers, such as a remote computer coupled to a network interface 596. The remote computer may be a personal computer, a server, a router, a network PC, a peer device or other common network node, and can include many or all of the elements described above relative to the computer 500. Networking environments are commonplace in offices, enterprise-wide area networks ("WAN"), local area networks ("LAN"), intranets, and the Internet.

When used in a LAN or WLAN networking environment, the computer 500 may be coupled to the LAN through the network interface 596 or an adapter. When used in a WAN networking environment, the computer 500 typically includes a modem or other means for establishing communications over the WAN, such as the Internet or the network 114. The WAN may include the Internet, the illustrated network 114, various other networks, or any combination thereof. It will be appreciated that other mechanisms of establishing a communications link, ring, mesh, bus, cloud, or network between the computers may be used.

According to some embodiments, the computer 500 may be coupled to a networking environment. The computer 500 may include one or more instances of a physical computer-readable storage medium or media associated with the drives 530 or other storage devices. The system bus may enable the processor 510 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 520, whether characterized as RAM, ROM, flash, or other types of volatile or nonvolatile memory technology. The media may also represent secondary storage, whether implemented as the storage drives 530 or otherwise. Hard drive implementations may be characterized as solid state, or may include rotating media storing magnetically-encoded information.

The storage media may include one or more program modules 560. The program modules 560 may include software instructions that, when loaded into the processor 510 and executed, transform a general-purpose computing system into a special-purpose computing system. As detailed throughout this description, the program modules 560 may provide various tools or techniques by which the computer 500 may participate within the overall systems or operating environments using the components, logic flows, and/or data structures discussed herein.

The processor 510 may be constructed from any number of transistors or other circuit elements, which may individually or collectively assume any number of states. More specifically, the processor 510 may operate as a state machine or finite-state machine. Such a machine may be transformed to a second machine, or specific machine by loading executable instructions contained within the program modules 560. These computer-executable instructions may transform the processor 510 by specifying how the processor 510 transitions between states, thereby transforming the transistors or other circuit elements constituting the processor 510 from a first machine to a second machine. The states of either machine may also be transformed by receiving input from the one or more user input devices 590, the network interface 596, other peripherals, other interfaces, or one or more users or other actors. Either machine may also transform states, or various physical characteristics of various output devices such as printers, speakers, video displays, or otherwise.

Encoding the program modules 560 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 560 may transform the physical state of the semiconductor memory 520 when the software is encoded therein. For example, the software may transform the state of transistors, capacitors, or other discrete circuit elements constituting the semiconductor memory 520.

As another example, the storage media may be implemented using magnetic or optical technology such as drives 530. In such implementations, the program modules 560 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Figure 6:
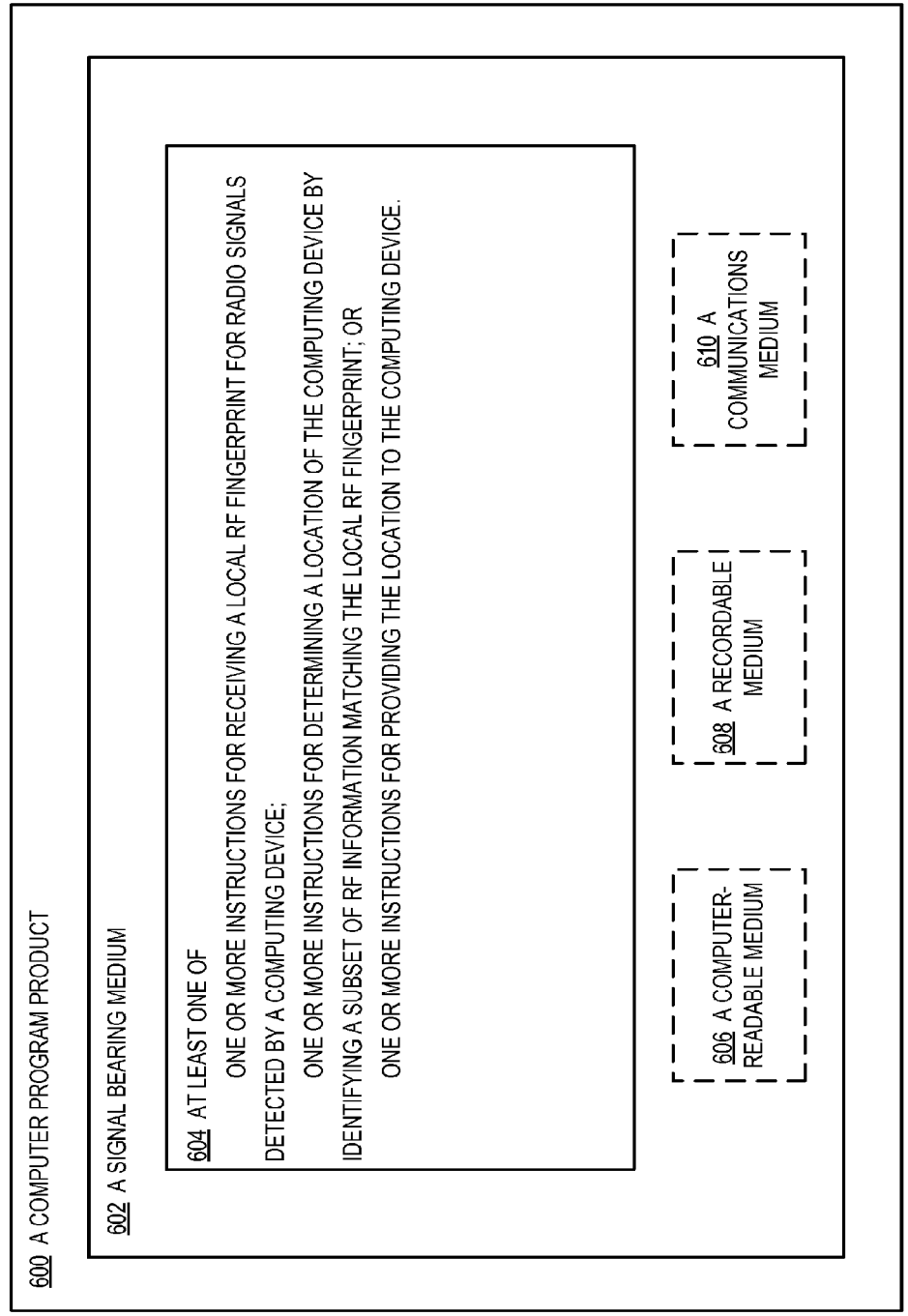
FIG. 6 is a schematic diagram illustrating a computer program product that includes a computer program for executing a computer process on a computing device.

FIG. 6 is a schematic diagram that illustrates a computer program product 600 that includes a computer program for executing a computer process on a computing device, arranged in accordance with at least some embodiments presented herein. An illustrative embodiment of the example computer program product is provided using a signal bearing medium 602, and may include at least one instruction of 604: one or more instructions for receiving a local RF fingerprint for radio signals detected by a computing device; one or more instructions for determining a location of the computing device by identifying a subset of RF information matching the local RF fingerprint; or one or more instructions for providing the location to the computing device. In some embodiments, the signal bearing medium 602 of the one or more computer program products 600 include a computer readable medium 606, a recordable medium 608, and/or a communications medium 610.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, and the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for determining a location of a computing device, comprising:
    collecting radio frequency (RF) information obtained by a plurality of cognitive radio devices having known locations;
    receiving, from the computing device, a local RF fingerprint for radio signals detected by the computing device;
    determining the location of the computing device by identifying a subset of the RF information matching the local RF fingerprint; and
    upon determining the location of the computing device, providing the location to the computing device.

2. The method of claim 1, wherein receiving, from the computing device, the local RF fingerprint for radio signals detected by the computing device comprises:
    receiving, from the computing device, power levels of the radio signals, each of the power levels corresponding to one of the radio signals; and
    receiving, from the computing device, channel identifiers associated with RF emitters that broadcasted the radio signals, each of the channel identifiers associated with one of the RF emitters.

3. The method of claim 2, wherein the RF emitters comprise a WI-FI base transceiver station, a television broadcast tower, a cellular base transceiver station, and a BLUETOOTH enabled device.

4. The method of claim 2, wherein the channel identifiers comprise service set identifiers (SSIDs) of the RF emitters.

5. The method of claim 2, wherein determining the location of the computing device by identifying the subset of the RF information matching the local RF fingerprint comprises:
    determining a vicinity of the computing device by performing a reverse nearest neighbor query on the channel identifiers;
    identifying a first subset of the RF information corresponding to the vicinity; and
    identifying a second subset of the first subset of the RF information matching the local RF fingerprint.

6. The method of claim 1, wherein the location comprises latitudinal and longitudinal coordinates.

7. The method of claim 1, wherein the RF information comprises licensed and unlicensed frequencies.

8. The method of claim 1, further comprising:
    receiving, from a cognitive radio device, additional RF information for additional radio signals detected by the cognitive radio device, wherein the cognitive radio device is configured to scan radio frequencies over a continuous spectrum and identify underutilized radio frequencies in the scanned radio frequencies; and
    updating the RF information with the additional RF information.

9. The method of claim 8, wherein receiving, from the cognitive radio device, the RF information comprises:
    receiving, from the cognitive radio device, frequencies of the additional radio signals, each of the frequencies corresponding to one of the additional radio signals;
    receiving, from the cognitive radio device, power levels of the additional radio signals, each of the power levels corresponding to one of the additional radio signals;
    receiving, from the cognitive radio device, channel identifiers associated with RF emitters that broadcasted the additional radio signals, each of the channel identifiers associated with one of the RF emitters; and
    receiving, from the cognitive radio device, a date and time that the frequencies, the power levels, and the channel identifiers were obtained by the cognitive radio device.

10. The method of claim 9, wherein receiving, from the cognitive radio device, the RF information further comprises:
    receiving, from the cognitive radio device, a device location of the cognitive radio device; and
    receiving, from the cognitive radio device, a location uncertainty of the device location.

11. The method of claim 10, wherein the device location of the cognitive radio device is determined based on a global positioning system (GPS) receiver in the cognitive radio device.

12. The method of claim 10, wherein the device location of the cognitive radio device is determined based on a known location of a wireless router coupled to the cognitive radio device.

13. The method of claim 10, wherein updating the RF information with the additional RF information comprises:
    determining whether the location uncertainty is below a threshold; and
    responsive to determination that the location uncertainty is below the threshold, updating the RF information with the additional RF information.

14. A system for determining a location of a computing device, comprising:
    a local positioning system adapted to:
        collect radio frequency (RF) information obtained by a plurality of cognitive radio devices having known locations;
        receive, from the computing device, a local RF fingerprint for radio signals detected by the computing device;
        determine the location of the computing device by identifying a subset of the RF information that matches the local RF fingerprint; and
        when upon determination of the location of the computing device, provide the location to the computing device.

15. The system of claim 14, wherein to receive, from the computing device, the local RF fingerprint for radio signals detected by the computing device, the local positioning system is further adapted to:
    receive, from the computing device, power levels of the radio signals, each of the power levels corresponding to one of the radio signals; and
    receive, from the computing device, channel identifiers associated with RF emitters that broadcasted the radio signals, each of the channel identifiers associated with one of the RF emitters.

16. The system of claim 15, wherein the RF emitters comprise a WI-FI base transceiver station, a television broadcast tower, a cellular base transceiver station, and a BLUETOOTH enabled device.

17. The system of claim 15, wherein the channel identifiers comprise service set identifiers (SSIDs) of the RF emitters.

18. The system of claim 15, wherein to determine the location of the computing device by identifying the subset of the RF information that matches the local RF fingerprint, the local positioning system is further adapted to:
    determine a vicinity of the computing device by performing a reverse nearest neighbor query on the channel identifiers;
    identify a first subset of the RF information that corresponds to the vicinity; and
    identify a second subset of the first subset of the RF information that matches the local RF fingerprint.

19. The system of claim 14, wherein the location comprises latitudinal and longitudinal coordinates.

20. The system of claim 14, wherein the computing device comprises a cognitive radio device.

21. The system of claim 14, wherein the local positioning system is further adapted to:
   receive, from a cognitive radio device, additional RF information for additional radio signals detected by the cognitive radio device, wherein the cognitive radio device is configured to scan radio frequencies over a continuous spectrum and identify underutilized radio frequencies in the scanned radio frequencies; and
   update the RF information with the additional RF information.

22. The system of claim 21, wherein to receive, from the cognitive radio device, the RF information, the local positioning system is further adapted to:
   receive, from the cognitive radio device, frequencies of the additional radio signals, each of the frequencies corresponding to one of the additional radio signals;
   receive, from the cognitive radio device, power levels of the additional radio signals, each of the power levels corresponding to one of the additional radio signals;
   receive, from the cognitive radio device, channel identifiers associated with RF emitters that broadcasted the additional radio signals, each of the channel identifiers associated with one of the RF emitters; and
   receive, from the cognitive radio device, a date and time that the frequencies, the power levels, and the channel identifiers were obtained by the cognitive radio device.

23. The system of claim 22, wherein to receive, from the cognitive radio device, the RF information further, the local positioning system is further adapted to:
   receive, from the cognitive radio device, a device location of the cognitive radio device; and
   receive, from the cognitive radio device, a location uncertainty of the device location.

24. The system of claim 23, wherein the device location of the cognitive radio device is determined based on a global positioning system (GPS) receiver in the cognitive radio device.

25. The system of claim 23, wherein the device location of the cognitive radio device is determined based on a known location of a wireless router coupled to the cognitive radio device.

26. The system of claim 23, wherein to update the RF information with the additional RF information, the local positioning system is further adapted to:
   determine whether the location uncertainty is below a threshold; and
   responsive to determination that the location uncertainty is below the threshold, update the RF information with the additional RF information.

27. A computer-readable medium having computer-executable instructions stored thereon which, when executed by a computer, cause the computer to:
   collect radio frequency (RF) information obtained by a plurality of cognitive radio devices having known locations, wherein the plurality of cognitive radio devices are configured to scan radio frequencies over a continuous spectrum and identify underutilized radio frequencies in the scanned radio frequencies;
   receive, from a cognitive radio device over a communications network, a request for a location of the cognitive radio device, the request including a local RF fingerprint for radio signals detected by the cognitive radio device;
   determine the location of the cognitive radio device by identifying a subset of the RF information that matches the local RF fingerprint; and
   upon determination of the location of the cognitive radio device, provide the location to the cognitive radio device over the communications network.

28. The computer-readable medium of claim 27, wherein the RF information comprises frequencies of previous radio signals, power levels of the previous radio signals, and channel identifiers associated with RF emitters that broadcasted the previous radio signals.

* * * * *